United States Patent
Huang et al.

(10) Patent No.: US 6,852,223 B2
(45) Date of Patent: Feb. 8, 2005

(54) ASYMMETRIC POROUS POLYTETRAFLUOROETHYLENE MEMBRANE AND PROCESS FOR PREPARING THE SAME

(75) Inventors: James Huang, Taichung (TW); William Chou, Taichung (TW); David Chou, Taichung (TW); Juin-Yih Lai, Chung-Li (TW); Kueir-Rarn Lee, Chung-Li (TW); Da-Ming Wang, Chung-Li (TW); Ruoh-Chyu Ruaan, Chung-Li (TW); Tian-Tsair Wu, Chung-Li (TW)

(73) Assignee: Yeu Ming Tai Chemical Industrial Co., Ltd., Taichung (TW)

( * ) Notice: Subject to any disclaimer, the term of this patent is extended or adjusted under 35 U.S.C. 154(b) by 172 days.

(21) Appl. No.: 10/281,311

(22) Filed: Oct. 28, 2002

(65) Prior Publication Data

US 2003/0089660 A1 May 15, 2003

(30) Foreign Application Priority Data

Oct. 31, 2001 (JP) ........................................ 2001-334956

(51) Int. Cl.[7] .............................................. B01D 71/36
(52) U.S. Cl. ........................... 210/500.36; 210/500.21; 210/490; 210/651; 210/653; 264/288.2; 264/290.2; 428/421
(58) Field of Search ................................ 210/490, 640, 210/644, 649, 651, 652, 500.21, 500.23, 500.36, 653; 428/421; 264/288.8, 290.2

(56) References Cited

U.S. PATENT DOCUMENTS

| | | | |
|---|---|---|---|
| 3,953,566 A | 4/1976 | Gore | 264/288 |
| 4,187,390 A | 2/1980 | Gore | 174/102 R |
| 4,248,924 A * | 2/1981 | Okita | 428/212 |
| 4,664,669 A * | 5/1987 | Ohyabu et al. | 428/304.4 |
| 5,098,625 A | 3/1992 | Huang et al. | 264/127 |
| 5,614,099 A * | 3/1997 | Hirose et al. | 210/653 |
| 5,853,894 A * | 12/1998 | Brown | 428/422 |
| 6,649,062 B1 * | 11/2003 | Petty | 210/649 |

* cited by examiner

Primary Examiner—W. L. Walker
Assistant Examiner—K S Menon
(74) Attorney, Agent, or Firm—Armstrong, Kratz, Quintos, Hanson & Brooks, LLP

(57) ABSTRACT

The present invention relates to an asymmetric porous polytetrafluoroethylene membrane comprising a dense skin layer and a continuously foamed porous layer, (1) the dense skin layer having a surface roughness Ra of 20 to 165 nm; (2) the dense skin layer having a contact angle for water of 120 to 135°; (3) the porous layer having a maximum pore diameter of 0.03 to 1.0 $\mu$m; and (4) the membrane having a total porosity of 20 to 70%. The asymmetric porous PTFE membrane has an ability to separate each liquid component from a liquid-liquid homogeneous mixture in addition to known properties such as water permeability resistance, gas permeability, sealing property and electric property, wherein change of these properties over time is small.

10 Claims, 3 Drawing Sheets

ASYMMETRIC POROUS POLYTETRAFLUOROETHYLENE MEMBRANE AND PROCESS FOR PREPARING THE SAME

BACKGROUND OF THE INVENTION

The present invention relates to an asymmetric porous polytetrafluoroethylene membrane and a process for preparing the same. More specifically, the present invention relates to an asymmetric porous polytetrafluoroethylene membrane having desirable and excellent liquid-liquid separation performance (hereinafter referred to as "separation performance") in addition to known characteristics of porous polytetrafluoroethylene membranes, such as water permeability resistance, gas permeability, sealing ability and electrical properties, and a process for preparing the same.

Porous polytetrafluoroethylene membrane (hereinafter referred to as porous PTFE membrane), which has excellent chemical resistance and high tensile strength, is preferred for various purposes such as filters for gas or liquid, water vapor permeable and water-impermeable membrane preparation for clothes and sheets of medical use, as well as sealing or gasket for piping or production facilities in the fields of chemical, food and semiconductor industries.

Such porous PTFE membranes and processes for preparing the same are disclosed in many patent publications such as U.S. Pat. No. 3,953,566, U.S. Pat. No. 4,187,390 and U.S. Pat. No. 5,098,625. According to those publications, a process for preparing a porous PTFE membrane generally comprises, extruding a PTFE paste comprising a mixture of PTFE fine powder and an extrusion aid such as naphtha; rolling the extrudates; removing the extrusion aid from the rolled article; then expanding the article uniaxially or biaxially; and heat-setting the expanded membrane at a temperature range from 35° C. to the melting point of PTFE in order to maintain the shape of the expanded porous PTFE membrane.

Porous PTFE membranes obtained by the above process are preferably used for sealing materials, filters, water vapor permeable and water impermeable materials for clothes and the like, but have not been used for particular application such as liquid-liquid separation where other polymeric membranes are utilized.

SUMMARY OF THE INVENTION

An object of the present invention is to provide an asymmetric porous polytetrafluoroethylene (PTFE) membrane which has ability to separate each liquid component from a homogeneous liquid-liquid mixture, in addition to known characteristics of porous PTFE molded articles, such as water permeability resistance, gas permeability, sealing performance and electrical properties with longer durability for a long period, and a process for preparing the same.

The reason why those conventional porous PTFE membranes do not have the above ability of separating liquid components from a liquid-liquid mixture seems that, although such porous PTFE membranes have a continuously foamed structure, pore structure, pore size and pore size distribution are similar throughout the membrane (the porosity being almost the same all over the membrane). In other words, it is because they have a symmetric porous structure.

As a result of intensive studies, it has been found that a separation performance can be imparted to porous PTFE membranes by making one surface thereof dense to form an asymmetric porous PTFE membrane comprising a dense skin layer and a lower-density continuously foamed porous layer.

That is, the present invention relates to an asymmetric porous polytetrafluoroethylene membrane comprising a dense skin layer and a continuously foamed porous layer, (1) the dense skin layer having a surface roughness Ra of 20 to 165 nm;
(2) the dense skin layer having a contact angle for water of 120 to 135°;
(3) the porous layer having a maximum pore diameter of 0.03 to 1.0 $\mu$m; and
(4) the membrane having a total porosity of 20 to 70%.

Preferably, the thickness of the skin layer is 0.04 to 40% of the total membrane thickness.

The present invention also relates to a process for preparing an asymmetric porous polytetrafluoroethylene membrane, which comprises heating one surface of a symmetric expanded porous polytetrafluoroethylene membrane with cooling the other surface of the symmetric expanded porous polytetrafluoroethylene membrane.

The present invention also relates to an asymmetric porous polytetrafluoroethylene membrane obtained by the above process.

The present invention also relates to a separation membrane which comprises the above asymmetric porous polytetrafluoroethylene membrane and has a thickness of 10 to 50 $\mu$m.

The present invention also relates to a process for separating water and alcohol from a mixture thereof, which comprises using, as a separation membrane, the above asymmetric porous polytetrafluoroethylene membrane having a total membrane thickness of 10 to 50 $\mu$m.

DETAILED DESCRIPTION

Figure 1:
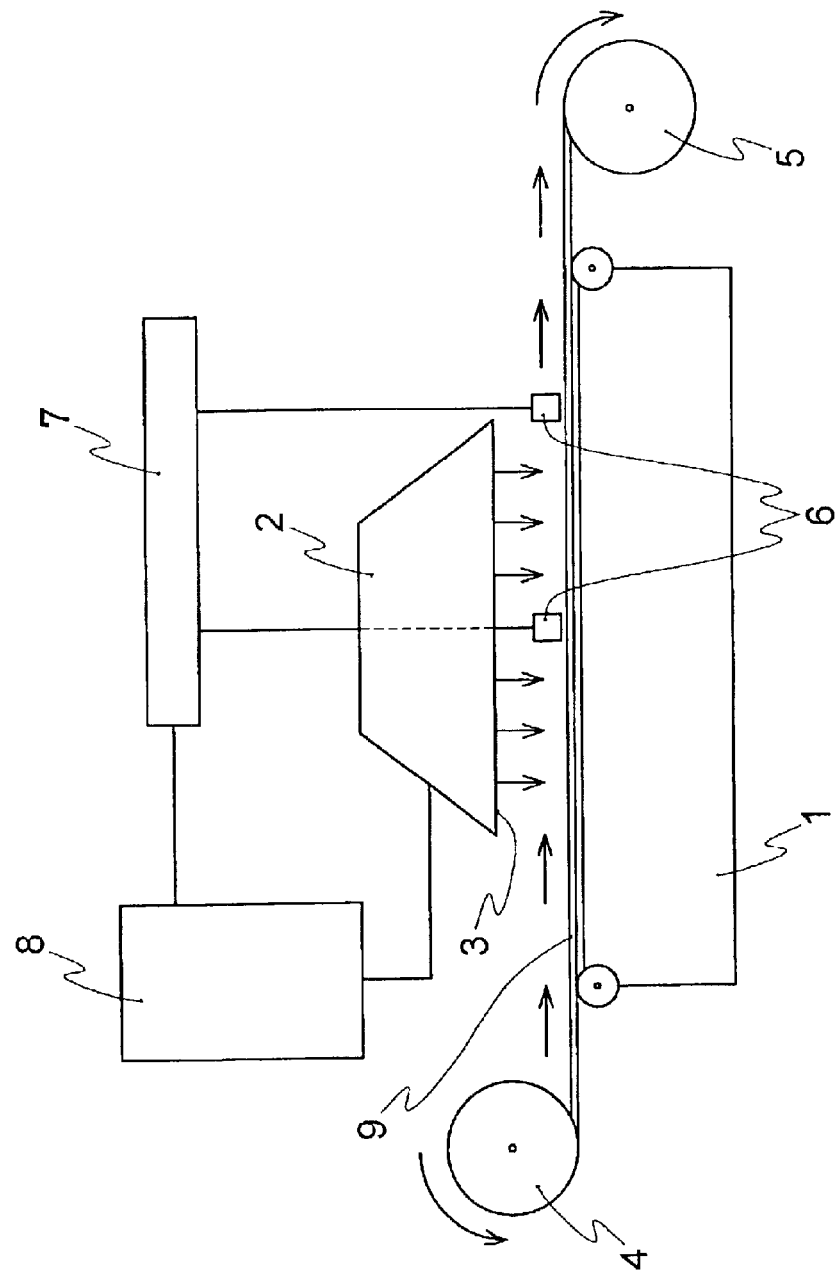
FIG. 1 is a schematic view showing an example of apparatus for heat treatment. This apparatus comprises a brine tank for cooling 1, a heater 2, a discharge port of heated air 3, a symmetric porous PTFE membrane supply roll 4, an asymmetric porous PTFE membrane take up roll 5, a temperature sensor 6, a temperature reader 7, a heating apparatus control 8 and PTFE membrane 9.

Basically, the expanded symmetric porous polytetrafluoroethylene membrane used in the present invention can be prepared by the five known steps indicated below.

(1) Step of Paste-Extruding PTFE Fine Powder

A paste mixture comprising PTFE fine powder obtained by emulsion polymerization and an extrusion aid such as naphtha is extruded by using an extruder to obtain extrudates in the form of a cylinder, a rectangular column or a sheet.

The PTFE fine powder is a powder prepared by coagulating an aqueous dispersion of a polymer obtained by emulsion polymerization to separate the polymer from the aqueous dispersion, and drying the same. The polymer is a tetrafluoroethylene (TFE) homopolymer, or a copolymer comprising TFE and a small amount, usually at most 0.5% by weight, of perfluoroalkyl vinyl ether or hexafluoropropylene (modified PTFE).

In this step, it is preferable to keep the orientation of the PTFE polymer as low as possible so that the subsequent expanding step can be carried out smoothly. The orientation can be kept low by selecting an appropriate reduction ratio (preferably at most 100:1, usually 20 to 60:1), PTFE/extrusion aid ratio (usually 77/23 to 80/20), die angle of the extruder (usually 60°) and the like.

(2) Step of Rolling Paste Extrudate

The extrudates obtained in step (1) is rolled in the extruding direction or the direction crossing at right angles to the extruding direction by using a calender roll or the like to give a sheet.

(3) Step of Removing Extrusion Aid

The extrusion aid is removed from the rolled sheet obtained in step (2) by heating or extraction with a solvent such as trichloroethane or trichloroethylene.

Heating temperature is properly selected depending on the kind of extrusion aids. The heating temperature is preferably 200° to 300° C., generally about 250° C. When the heating temperature is higher than 300° C., for example, above 327° C. which is the melting point of PTFE, there is a possibility that the rolled sheet is sintered.

(4) Expanding Step

The rolled sheet containing no extrusion aid obtained in step (3) is expanded uniaxially or biaxially. The rolled sheet may be pre-heated to about 300° C. before expanding. In case of the biaxial expanding, the sheet may be expanded in the two directions at one try or one by one.

The expanding ratio should be carefully selected since tensile strength of the membrane and the like may be influenced. The expanding ratio is usually in the range of 300% to 1,000%, preferably 400% to 800% in magnification by area. When the expanding ratio is less than 300%, there is a tendency that a desirable pore diameter or porosity cannot be achieved. When the expanding ratio is more than 1,000%, there is also a tendency that neither desirable pore diameter nor porosity can be achieved.

(5) Heat-Setting Step

The expanded sheet obtained in step (4) is heat-treated at temperature of 340 to 380° C. which is slightly higher than the melting point of PTFE (about 327° C.) and lower than the decomposition temperature of PTFE for a relatively short period of time (5 to 15 seconds) for heat-setting. When the temperature is lower than 340° C., heat-setting is insufficient. When the temperature is higher than 380° C., the heat-setting time must be shortened, and it tends to be difficult to control the heat-setting time.

In the present invention, an asymmetric porous PTFE membrane is prepared by heating one surface of the expanded porous PTFE membrane obtained in the above manner with cooling the other surface and then cooling the asymmetric membrane. FIG. 1 illustrates an example of the apparatus for preparing the membrane and a process thereof, but the apparatus and process are not limited thereto. In the followings, the preparation process of the present invention is explained in detail with reference to FIG. 1.

The symmetric porous PTFE membrane heat-set and cooled in step (5) is supplied from the supply roll 4 and transported between the heater 2 and the brine bath 1. Herein, the surface temperature of PTFE membrane is measured by the temperature sensor 6 and read by the temperature reader 7. Thereafter, this temperature information is sent to the heating apparatus control 8, and the information is used to control the temperature of heated air discharged from the heater 2 via heated air discharge port 3. In the meantime, cooling liquid is circulated in the brine bath 1 to keep a pre-determined temperature. The PTFE membrane is transported through these units and rolled onto the taken up roll 5.

In this case, the heater 2 provides the following heat treatment conditions. That is, the expanded symmetric porous PTFE membrane is heated at a temperature of 260° to 380° C., preferably 340° to 360° C. for 5 to 15 seconds, preferably 6 to 10 seconds. When the heating temperature is lower than 260° C., formation of the skin layer tends to be insufficient. When the heating temperature is higher than 380° C., the skin layer becomes extremely thick and its function as a separation membrane tends to be deteriorated.

As mentioned above, by re-heating one surface of the heat-set symmetric porous PTFE membrane, only one surface of the membrane is modified, and an asymmetric porous PTFE having a porous structure, particular surface roughness and contact angle is obtained.

Judging from SEM images, the asymmetric porous PTFE membrane of the present invention has a dense skin layer and a porous layer with a porous structure similar to that of conventional symmetric porous PTFE membranes, while conventional symmetric porous PTFE membranes have the same porous structure all over the membrane. The total porosity of the asymmetric porous PTFE membrane is 20 to 70%. In view of the fact that the porosity of symmetric porous PTFE membranes is 45 to 90%, it is found that densification is significantly promoted in case of the asymmetric porous PTFE membrane. When the porosity is less than 20%, permeation amount is decreased and separation efficiency is decreased. When the porosity is more than 70%, selectivity in separation, i.e., separation performance is decreased. Preferably, the total porosity of the asymmetric porous PTFE membrane is 30 to 60%. Herein, the total porosity is calculated according to the following equation from the measurement of density.

$$\text{Porosity }(\%)=[1-(PTFE \text{ apparent density}/PTFE\ SSG)]\times 100$$

In the formula, PTFE apparent density (g/cc)=weight of porous PTFE membrane (W)/volume (V) of porous PTFE, and PTFE SSG (Standard Specific Gravity of PTFE) (g/cc)= 2.15 (from literature).

The maximum pore diameter of the porous layer of the asymmetric porous PTFE membrane of the present invention is 0.03 to 1.0 $\mu$m. When the maximum pore diameter is smaller than 0.03 $\mu$m, permeation amount is decreased and separation efficiency is decreased. When the maximum pore diameter is larger than 1.0 $\mu$m, selectivity in separation, i.e., separation performance is decreased. Preferably, the maximum pore diameter of the porous layer is 0.04 to 0.80 $\mu$m. Herein, the maximum pore diameter is calculated as follows:

First, a symmetric porous PTFE membrane and an asymmetric PTFE membrane obtained by heat treating the symmetric porous PTFE membrane are compared using SEM photographs (×20,000 magnification). It is confirmed that there is no change in the pore diameter and the pore structure of the porous layer before and after the heat treatment. One of the characteristics of the present invention is that only the skin layer of the membrane is modified after heat treatment while the pore diameter and the pore structure of the porous layer remain unchanged. Herein, a scanning electron microscope Hitachi Model S-4000 is used.

Second, the maximum pore diameter of the symmetric porous PTFE membrane is measured by using a porosimeter, and the value is employed as the maximum pore diameter of the asymmetric porous PTFE membrane.

i) Measuring machine: Porosimeter PMI-1500 (porosity measuring machine) made by Porous Materials Inc. is used.

ii) Measurement: A membrane sample is attached in the sample chamber of the measuring machine, and measurement is then started in the automatic mode. With the start of the measurement, gas (nitrogen gas) is introduced to one surface of the membrane and the introduction rate of the gas is controlled automatically.

When the pressure of the introduced gas remains low, the membrane sample functions as a barrier, and the inside pressure of the sample chamber is gradually increased. As the sample loses its barrier function with the increase of the pressure, the gas begins to permeate through the sample. The pressure of the sample chamber then ceases to increase, and the pressure is measured at this point.

Measurement of pressure as mentioned above is carried out for a dried membrane and a membrane wetted by Porewick solution, and the measured value is represented as Pressure $P_1$ and Pressure $P_2$, respectively.

The Porewick solution (trade name) is a standard wetting solution whose surface tension is adjusted to 16 dyne/cm, available from Porous Materials Inc.

iii) The maximum pore diameter is calculated according to the following equation.

$$d = C \cdot (\tau / \Delta P)$$

In the formula, d=the maximum pore diameter ($\mu$m), C=0.415 (psi), $\tau$=surface tension (dyne/cm) of the wetting solution, and $\Delta P = P_2 - P_1$ (psi).

The skin layer of the asymmetric porous PTFE membrane of the present invention has a contact angle for water of 120 to 135°, which is substantially higher than the contact angle for water of 115 to 118° of the symmetric porous PTFE membrane. It is considered that this is because the apparent contact angle becomes larger, correlating to the fact that the surface roughness of the skin layer becomes larger as mentioned below. Based on this, it is found that the affinity for water of the skin layer of the asymmetric porous PTFE membrane is lower than the affinity for water of the symmetric porous PTFE membrane. When the contact angle for water is smaller than 120°, selectivity in separation, i.e., separation performance is decreased. When the contact angle for water is larger than 135°, selectivity in separation, i.e., separation performance is also decreased. More preferably, the contact angle for water of the skin layer is 125 to 130°. Herein, contact angle for water is calculated according to the following equation:

$$\text{Contact angle} = 2 \tan^{-1} (h/r)$$

In the formula, "h" is the height of spherical water droplet and "r" is the radius of the droplet.

The surface roughness Ra of the skin layer of the asymmetric porous PTFE membrane of the present invention is 20 to 165 nm. This means that the surface of the skin layer is substantially rougher than that of the symmetric porous PTFE membrane whose surface roughness is 8 to 15 nm. Based on this observation, the surface area of the asymmetric porous PTFE membrane of the present invention is significantly increased. When the Ra is less than 20 nm, permeability (separation rate) is remarkably lower, resulting in decrease of separation efficiency. When the Ra is more than 165 nm, separation performance is decreased. Herein, the surface roughness Ra is calculated by the following method.

Tapping Mode AFM Type D.I. 3A made by Digital Instrument Inc. is used as a measuring machine.

When a sample is subjected to roughness analysis, surface roughness Ra is automatically measured and the measured value is printed out. The measuring area is defined as a square of 50 $\mu$m×50 $\mu$m on the sample surface.

The heat of fusion of the PTFE crystal of the asymmetric porous PTFE membrane of the present invention obtained by differential thermal analysis is 25 to 75 J/g. Compared with the heat of fusion of the crystal of the symmetric porous PTFE membrane, which is 40 to 50 J/g, the range of crystallization degree becomes broader in case of the asymmetric porous PTFE membrane of the present invention.

The asymmetric porous PTFE membrane of the present invention has a separation performance that conventional PTFE membranes do not have. Though precise reason is not clear, it is considered that such separation performance is derived from the above property changes achieved by heat-treating only one face of the conventional symmetric porous PTFE membrane.

Preferably, the thickness of the skin layer is 0.04 to 40% of the total membrane thickness. More preferably, the lower limit is 0.1% and the upper limit is 30%. When the thickness of the skin layer is less than 0.04% of the total membrane thickness, separation performance tends to be decreased. When the thickness of the skin layer is more than 40% of the total membrane thickness, separation performance also tends to be decreased. In this case, the total membrane thickness is preferably 10 to 300 $\mu$m.

In case of using the asymmetric porous PTFE membrane of the present invention as a separation membrane, the total membrane thickness is preferably 10 to 50 $\mu$m, more preferably 20 to 40 $\mu$m. Herein, the thickness of the skin layer is preferably 0.2 to 5 $\mu$m, more preferably 1 to 3 $\mu$m. When the thickness of the skin layer is less than 0.2 $\mu$m, separation performance tends to be decreased. When the thickness of the skin layer is more than 5 $\mu$m, separation performance also tends to be decreased.

Laminated with cloth or the like, the asymmetric porous PTFE membrane of the present invention can be used for preparing clothing items or outdoor goods having excellent air and moisture permeability and water resistance, oxygen censor, separation membrane for batteries and container for volatile chemical. For laminating the PTFE membrane with cloth, a method of using an adhesive or a method of pressing is adopted.

Having excellent separation performance, the asymmetric porous PTFE membrane of the present invention can be used as a membrane for removing water from a mixture of alcohol and water, an air filter, an oil filter and the like.

Furthermore, the asymmetric porous PTFE membrane of the present invention can be used as coating materials for electric wire, such as wire for computer, and insulating materials for coaxial cable utilizing its excellent electric properties.

In addition, the asymmetric porous PTFE membrane of the present invention can be used as various sealing materials taking advantage of its excellent heat resistance, low temperature resistance and chemical resistance.

EXAMPLE

Hereinafter, the present invention is explained in detail based on Examples, but the present invention is not limited thereto. "Part" and "%" in Examples mean "part by weight" and "% by weight", respectively, unless otherwise specified.

Figure 2A:
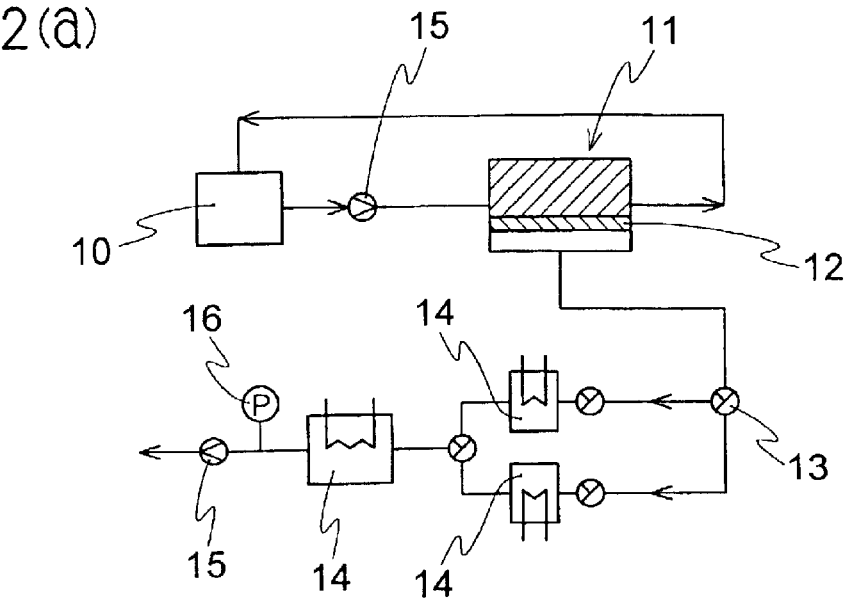
FIG. 2(a) is a view showing pervaporation equipment which comprises a feed 10, a permeation cell 11, a separation membrane 12, a cock 13, a cooled trap 14, a circulation pump 15, a vacuum gauge 16 and vacuum 17.
Figure 2B:
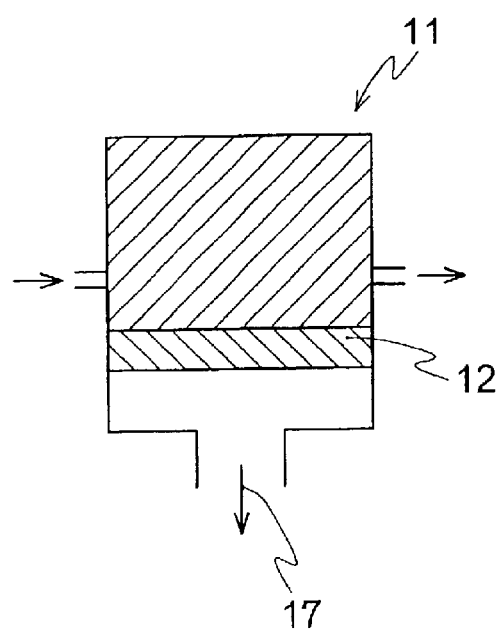
FIG. 2(b) is an enlarged view of permeation cell which is a part of the equipment of FIG. 2(a).
Figure 3A:
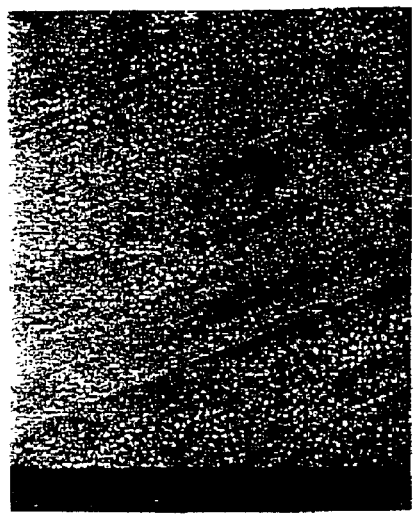
FIG. 3(a) is an electron micrograph of a porous PTFE membrane without heat treatment.
Figure 3B:
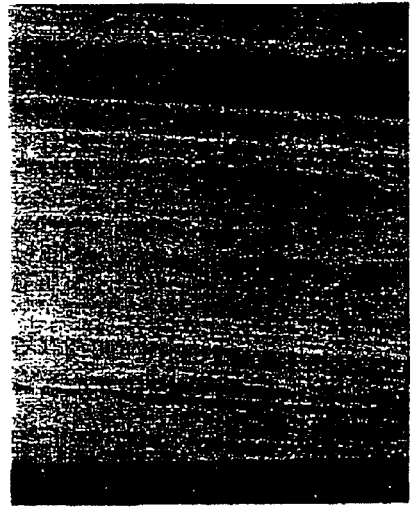
FIGS. 3(b), (c) and (d) are electron micrographs of porous PTFE membranes heat-treated at 260° C., 300° C. and 340° C., respectively.
Figure 3C:
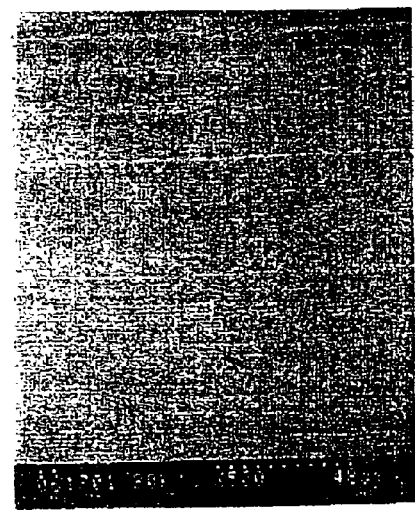
Figure 3D:
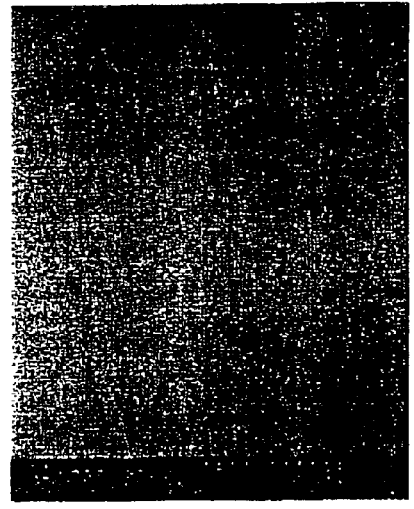

[Measuring Method]
Pore Diameter:
 Pore diameter was measured by using SEM images (SEM: MODEL S570 made by Hitachi, Ltd.).
Porosity:
 Weight (W) and volume (V) of the porous PTFE membrane were measured and porosity was calculated according to the following equation:

$$\text{Porosity (\%)}=[1-(PTFE\text{ apparent density}/PTFE\ SSG)]\times 100$$

wherein PTFE apparent density (g/cc)=W/V, and PTFE SSG (g/cc)=2.15 (from literature).
Contact Angle for Water:
 Contact angle was calculated by using a contact angle measuring machine CA-D made by Kyowa Interface-science Co., Ltd. according to the following equation:

$$\text{Contact angle}=2\tan^{-1}(h/r)$$

wherein h=height of spherical water droplet and r=radius of the droplet.
Surface Roughness:
 Surface roughness was measured by using AFM DI5000 made by Digital Instrument Inc.
Heat of Fusion of Crystal:
 Heat of fusion of crystal was measured by using a differential thermal analyzer DSC-7 made by Perkin-Elmer Inc. under a nitrogen stream of 60 cm$^3$/minute at a temperature increase rate of 20° C./minute. The higher the heat of fusion is, the higher the crystallization degree of PTFE is.
Separation Performance for Alcohol-Water Mixture:
 Separation performance for a mixture of alcohol and water was measured by using a pervaporation equipment shown in FIG. 2. Compositions of supplied solution and permeation gas (liquefied in the cooled trap) were analyzed according to gas chromatography.

Examples 1 to 4

A paste mixture comprising 80 parts of a PTFE fine powder prepared by emulsion polymerization and 20 parts of naphtha was extruded by using an extruder at a reduction ratio of 56:1 to obtain a rod extrudate having a diameter of 18 mm. The extrudate was rolled in the extrusion direction using a calender roll to obtain a rolled sheet having a size of 220 mm in width and 1.0 mm in thickness. The sheet was then heated in an oven up to 260° C. to remove naphtha. Thereafter, the sheet was pre-heated to 300° C. and subjected to simultaneous biaxial expanding, i.e. expanded in the rolling direction and the direction crossing at right angles to the rolling direction simultaneously under a expanding ratio of 300%/second. With maintaining the expansion, the sheet was heat-set by heating at 340° C. for 15 seconds. The sheet was then cooled to room temperature to obtain a symmetric porous PTFE membrane having a thickness of 50 μm, a pore diameter of 0.05 to 0.08 μm (the maximum pore diameter measured by using Porosimeter PMI-1500: 0.083 μm) and a porosity of 75%.

Subsequently, the symmetric porous PTFE membrane was treated with the heat treatment apparatus of FIG. 1, and the temperature of the brine tank for cooling 1 was kept at −10° C., while the heated air discharged from the heater 2 via heated air discharge port 3 was adjusted to 260° C., 300° C., 340° C. and 380° C.; and the passing time of the membrane at the heated air discharge port area was adjusted to 7 seconds, allowing only one surface of the above PTFE membrane to be heat-treated to obtain an asymmetric porous PTFE membrane. The evaluation results are shown in Table 1.

Comparative Example 1

An asymmetric porous PTFE membrane was obtained in the same manner as in Example 1 except that the heated air was adjusted to 400° C. The evaluation results are shown in Table 1.

Comparative Example 2

A symmetric porous PTFE membrane was prepared in the same manner as in Example 1 except for the heat treatment and subjected to evaluation tests. The results are shown in Table 1.

TABLE 1

| | Heat treating temperature (° C.) | Porosity (%) | Pore diameter (μm) | Contact angle for water (°) | Surface roughness Ra* (nm) | Separation ability for mixture of alcohol and water*** | |
|---|---|---|---|---|---|---|---|
| | | | | | | Permeation rate (g/m$^2$/hr) | Amount of water in permeated mixture (wt %) |
| Ex. 1 | 260° C. | 70 | 0.05–0.08 | 123 | 125.5 | 1,115 | 43 |
| Ex. 2 | 300° C. | 63 | 0.05–0.08 | 129 | 56.2 | 983 | 74 |
| Ex. 3 | 340° C. | 52 | 0.04–0.08 | 131 | 28.9 | 417 | 99 |
| Ex. 4 | 380° C. | 28 | 0.03–0.08 | 130 | 158.5 | 298 | 35 |
| Com. Ex. 1 | 400° C. | 15 | 0.01–0.08 | 137 | ** | 50 | — |
| Com. Ex. 2 | Not heat-treated | 75 | 0.05–0.08 | 117 | 9.8 | 2,047 | 10 |

*Ra is "average plane roughness"
**Measurement was impossible because the film was too rough.
***Concentration of supplied ethyl alcohol: 90% by weight (water: 10% by weight)
Temperature: 20° C.

According to the present invention, an asymmetric porous polytetrafluoroethylene (PTFE) membrane is provided, which has ability to separate each liquid component from a homogeneous liquid-liquid mixture, in addition to known characteristics such as water permeability resistance, gas permeability, sealing performance and electrical properties with smaller property changes over time.

Furthermore, according to the present invention, since an asymmetric porous PTFE membrane having a total membrane thickness of 10 to 50 μm is used as a separation membrane, separation of alcohol and water from a mixture thereof can be carried out more efficiently with lower energy consumption compared with separation method by distillation.

What is claimed is:

1. An asymmetric porous polytetrafluoroethylene membrane comprising a dense skin layer and a continuously foamed porous layer,
   (1) said dense skin layer having a surface roughness Ra of 20 to 165 nm;
   (2) said dense skin layer having a contact angle for water of 120 to 135°;
   (3) said porous layer having a maximum pore diameter of 0.03 to 1.0 um; and
   (4) said membrane having a total porosity of 20 to 70%.

2. The asymmetric porous polytetrafluoroethylene membrane of claim 1, wherein a thickness of the dense skin layer is 0.04 to 40% of the total membrane thickness.

3. A process for preparing an asymmetric porous polytetrafluoroethylene membrane, which comprises re-heating one surface of a symmetric expanded porous polytetrafluoroethylene membrane, after heat treating the membrane at a temperature higher than the melting point of the membrane, with cooling the other surface of the symmetric expanded porous polytetrafluoroethylene membrane, whereby an asymmetric porous membrane is obtained.

4. An asymmetric porous polytetrafluoroethylene membrane obtained by the process of the claim 3.

5. A separation membrane which comprises the asymmetric porous polytetrafluoroethylene membrane of claim 1, and has a thickness of 10 to 50 um.

6. A process for separating water and alcohol from a mixture thereof, which comprises using, as a separation membrane, the asymmetric porous polytetrafluoroethylene membrane of claim 1 having a total membrane thickness of 10 to 50 um.

7. The process of claim 3, wherein one surface of a symmetric expanded porous polytetrafluoroethylene membrane is re-heated to a temperature of 260 to 380° C.

8. The process of claim 3, wherein one surface of a symmetric expanded porous polytetrafluoroethylene membrane is re-heated to a temperature of 340 to 360° C.

9. The process of claim 7, wherein one surface of a symmetric expanded porous polytetrafluoroethylene membrane is reheated for 5 to 15 seconds.

10. The process of claim 3, wherein one surface of a symmetric expanded porous polytetrafluoroethylene membrane is reheated by a heater with the other surface being cooled by a brine bath.

* * * * *